(12) United States Patent
Winfree

(10) Patent No.: US 6,467,578 B1
(45) Date of Patent: Oct. 22, 2002

(54) GEAR BAFFLE WINDAGE TEST RIG

(75) Inventor: Don D. Winfree, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/572,110

(22) Filed: May 17, 2000

(51) Int. Cl.[7] .............................................. F01M 11/00
(52) U.S. Cl. ........................ 184/6.12; 184/6.16; 73/162; 415/122.1
(58) Field of Search ............................. 184/6.12, 6.16; 73/162; 415/122.1

(56) References Cited

U.S. PATENT DOCUMENTS

| | | | |
|---|---|---|---|
| 5,404,964 A | * | 4/1995 | Zinsmeyer et al. ........ 184/6.12 |
| 5,689,993 A | * | 11/1997 | Matsumoto ................... 73/162 |
| 6,018,962 A | * | 2/2000 | Dewhirst et al. ............. 62/648 |

OTHER PUBLICATIONS

"Windage loss in larger high-speed gears"; Proc Instn Mech Engrs vol. 198A, No. 1.

* cited by examiner

*Primary Examiner*—Hezron Williams
*Assistant Examiner*—André K. Jackson
(74) *Attorney, Agent, or Firm*—Bracewell & Patterson, L.L.P.

(57) ABSTRACT

A test fixture will test windage on high-speed gears. The test fixture has a case with a sump. A shaft is rotatably mounted in the case for receiving and rotating a test gear. A power source is coupled to the shaft for driving the shaft. A nozzle is mounted in the case for discharging a liquid onto the gear teeth, the liquid then collecting in the sump. A pump is connected to the sump and the nozzle for pumping the liquid from the sump to the nozzle. A baffle mounts to a wall of the case and encloses at least a portion of the gear. The power to the motor as well as temperature are sensed to determine various baffle configuration efficiencies.

20 Claims, 2 Drawing Sheets

GEAR BAFFLE WINDAGE TEST RIG

TECHNICAL FIELD

This invention relates in general to testing devices for testing high-speed rotary equipment and particularly to a test unit for testing the effect of baffles on gear windage.

BACKGROUND ART

As gears in a geartrain rotate, they create windage. Windage is the frictional resistance of the teeth moving through the fluid containing the gear, whether it is air, liquid or air with a spray of a cooling or lubricating liquid. Windage increases greatly as the peripheral speed increases. For example, with gears that have peripheral speeds between 10,000 and 25,000 feet per minute, the windage can be very significant. Windage creates heat and also consumes power from the power source.

In the past, it was found that baffles can reduce the effect of windage. Typically, a baffle is a bowl-shaped shroud that encloses a substantial portion of the gear. There can be many shapes of baffles, and the spacing between the baffles and the gears can vary greatly. There have not been any good ways to test the efficiency of various baffles relative to each other.

DISCLOSURE OF THE INVENTION

An apparatus is provided for testing windage on high-speed gears. The apparatus includes a case that has a sump. A shaft is rotatably mounted in the case for receiving and rotating a test gear. A power source is optimally coupled to the shaft for driving the shaft. A nozzle is mounted in the case for discharging a liquid onto the gear, which then collects in the sump. A pump is connected to the sump and the nozzle for pumping the liquid from the sump to the nozzle. The case has a wall for mounting a test baffle to it for enclosing at least a portion of the gear to test the efficiency of the baffle on reducing windage on the gear. Various sensors are employed to monitor the power required for rotating the gear as well as the temperature rise.

BEST MODE FOR CARRYING OUT THE INVENTION

Figure 1:
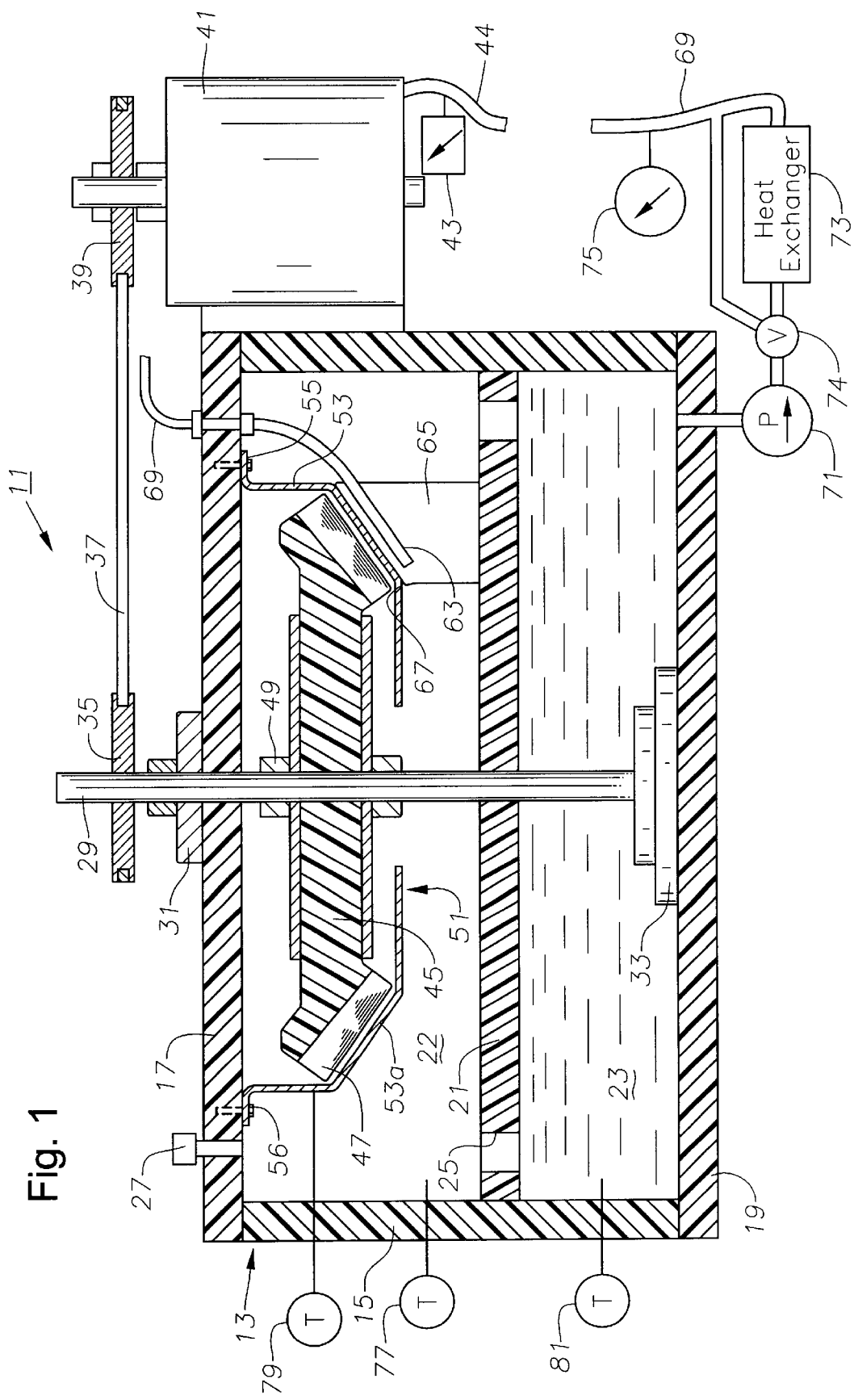
FIG. 1 is a schematic sectional view of a test rig constructed in accordance with this invention.

Referring to FIG. 1, test unit 11 includes a case 13 that is rectangular in the embodiment shown. Case 13 is preferably of a transparent acrylic material so that components undergoing testing can be observed from the exterior. Case 13 has four side walls 15, a top plate 17 and a bottom plate 19. An optional partition 21 extends between sidewalls 15 parallel to top and bottom plates 17, 19. Partition 21 separates case 13 into a test compartment 22 located above partition 21 and a sump 23 located below partition 21. One or more drain holes 25 in partition 21 enable fluid sprayed into test compartment 22 to drain into sump 23. A vent 27 extends from top plate 17 for maintaining ambient air pressure within test compartment 22.

A shaft 29 is mounted to case 13 by bearings 31, 33. The lower end of shaft 29 locates in lower bearing 33, which is mounted to bottom plate 19. Shaft 29 is rotatable relative to case 13 and is rotated by a drive system. In this embodiment, the drive system comprises a pulley 35 that is fixed to shaft 29 above top plate 17. Pulley 35 is driven by belt 37, which is in turn driven by drive pulley 39. Drive pulley 39 is rotated by an electrical motor 41. Other drive systems could be utilized, such as direct drive. The power to operate electrical motor 41 is monitored, preferably by a current meter 43, which monitors electrical current being supplied through a power lead 44.

A test gear 45 is adapted to be mounted within case 13. Test gear 45 is preferably a simulation of a metal gear made of plastic or other light weight material. Test gear 45 is secured to shaft 29 by a coupling 49 so that shaft 29 will rotate test gear 45. Test gear 45 may be of various configurations. In this embodiment, it comprises a beveled gear having teeth 47 that are inclined relative to an axis of rotation.

A test baffle 51 is shown enclosing a substantial portion of test gear 45. Test baffle 51 may be of various configurations. In this embodiment, it is be bowl-shaped for receiving beveled gear 45, having a sidewall 53 that has a conical portion 53a that is generally parallel to the surface of revolution of gear teeth 47. Baffle 51 has an upper flange 55 for securing to the lower side of top plate 17 by fasteners 56. A central hole 57 in baffle 51 allows the passage of shaft 29.

Figure 2:
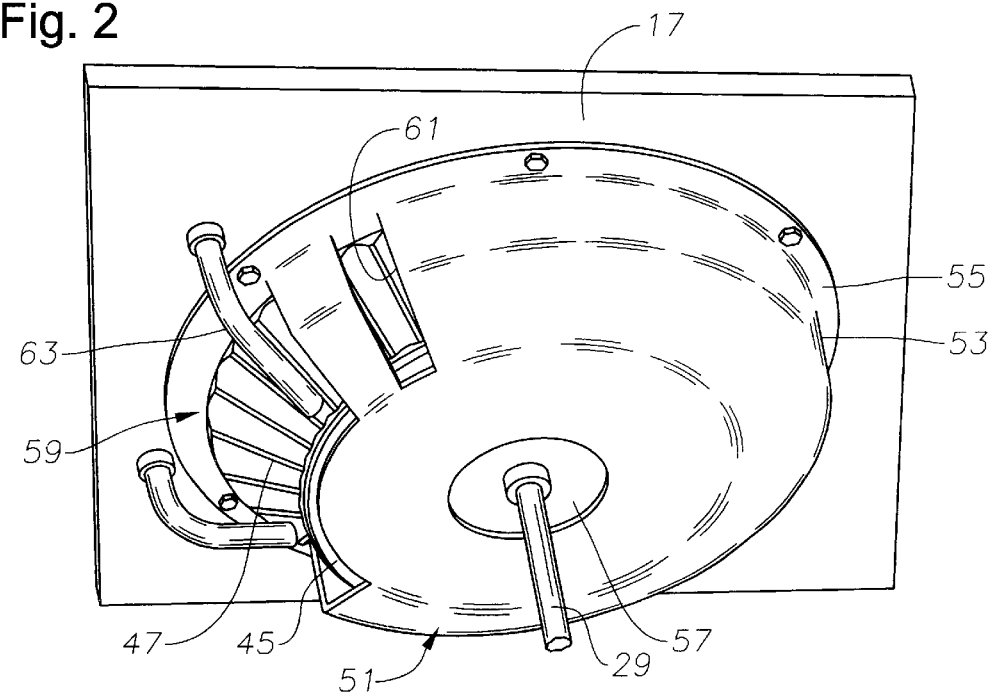
FIG. 2 is an elevational view of the lower side of the top plate of the test rig of FIG. 1, showing also a test gear and a test baffle.

Referring to FIG. 2, baffle 51 has a side opening 59, which is a segment that approximates the opening that would be required in actual use for receiving a spur gear (not shown) that would mesh with test gear 45. Opening segment 59 extends from flange 55 through conical portion 53a. This presents a generally pie-shaped opening that is truncated on the end opposite flange 55. The circumferential extent may vary, but is roughly 60 degrees in the embodiment shown. Also, baffle 51 has one or more outlet segments 61 (only one shown) spaced circumferentially from opening segment 59. Outlet segments 61 serve for discharging fluid sprayed on test gear 45. Each outlet segment 61 is also generally pie-shaped, with a truncated end and extends from flange 55 through conical section 53a. Typically, the circumferential extent of outlet segment 61 will be considerably less than opening segment 59.

A pair of nozzles 63 are mounted adjacent opening segment 59. One nozzle 63 sprays liquid on the leading side of the junction where a pinion gear meshes with gear teeth 47. The other nozzle 63 sprays liquid on the trailing side of where a pinion gear would mesh with gear teeth 47. In an actual gear train, the first mentioned nozzle 63 may be spraying lubricant, and the second may be spraying a coolant. The volumes could differ, with 25% of the total flow flowing through the first nozzle 63 and 75% passing through the second nozzle 63. The flow rates for testing can be varied by valves to each nozzle 63, or by changing the sizes of the orifices of nozzles 63. Further, if desired, one may test with only the second, or cooling nozzle 63 in operation. The two nozzles 63 also enable testing of gear 45 if rotated in two different directions, if desired. Each nozzle 63 extends in close proximity to teeth 47 for discharging onto teeth 47. Nozzles 63 are spaced circumferentially apart from each other, each located near opposite edges of opening segment 59.

As shown in FIG. 1, a blocking plate 65 extends upward from partition 21. Blocking plate 65 has an inclined upper edge 67 that is at the same angle as teeth 47. Inclined edge 67 is closely spaced to teeth 47 and separates the two nozzles 63. Blocking plate 65 simulates the blocking action of a spur gear by blocking flow from one nozzle 63 across the teeth toward the other nozzle 63.

As shown also in FIG. 1, each nozzle 63 is connected to a flow line 69, which in turn is connected to a pump 71. A heat exchanger 73 may be employed either before or after pump 71 for cooling liquid passing to nozzles 63 before running a subsequent test. Pump 71 has an inlet connected to sump 23. A valve 74 between pump 71 and heat exchanger 73 enables heat exchanger 73 to be bypassed while running a test. An oil pressure sensor 75 senses the pressure of the oil flow.

Preferably, at least three temperature sensors are employed. Sensor 77 senses the temperature of the air within case 13. Sensor 79 senses the temperature of the baffle 51. Sensor 81 senses the temperature of the liquid within sump 23.

In operation, motor 41 rotates shaft 29 and gear 47 at a selected constant rate of speed for a selected time duration, say five minutes. A selected one or both of the nozzles 63 discharges liquid, such as oil or water, pumped from sump 23. the liquid flows back drain holes 25 into sump 23. For testing, preferably valve 74 is positioned to bypass heat exchanger 73. Thus pump 71 returns the liquid to nozzles 63.

The operator will note current on current meter 43, carefully recording the current required to rotate gear 45 at the preselected speed. The operator will note the rise in temperature from temperature gages 77, 79, and 81. The operator also notes the oil pressure. The operator will compare the current required as well as the rate of temperature increase to measure the efficiency of a particular test baffle 51.

Figure 3:
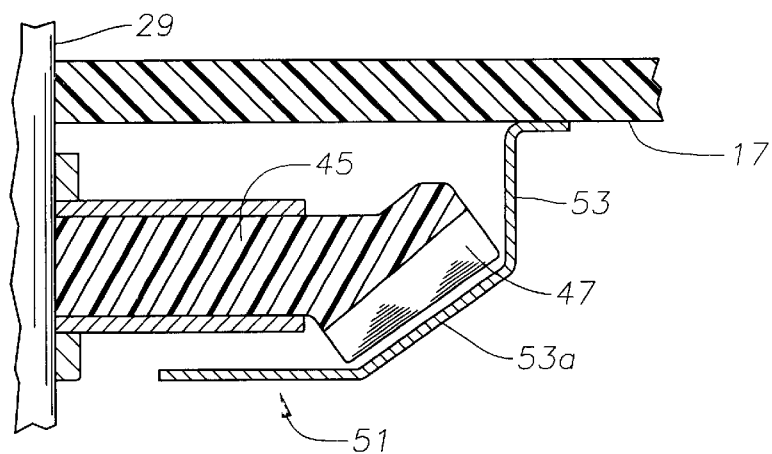
FIG. 3 is a schematic sectional view of a portion of the test rig of FIG. 1, showing one configuration of a baffle.
Figure 4:
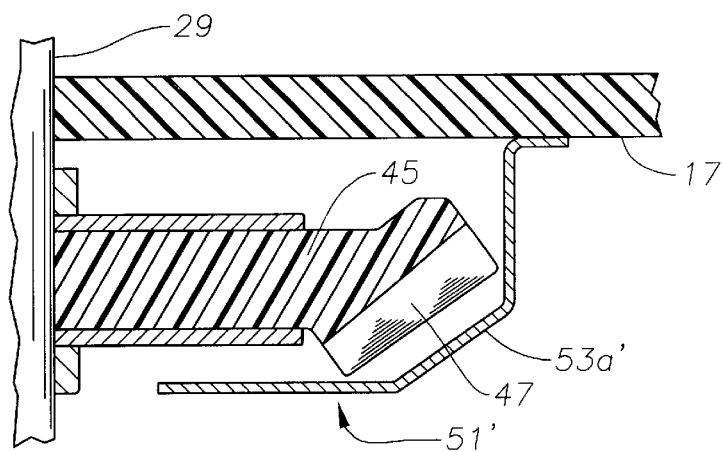
FIG. 4 is a sectional view of a portion of the test rig of FIG. 1, showing another configuration of a baffle.

After the testing has been completed, the operator stops rotating gear 45 and switches valve 74 to cause pump 71 to circulate the liquid through heat exchanger 73. The liquid flows through nozzles 63 and cools back down to a reference temperature. After cooling, the operator lifts upper plate 17 from case 13, exposing baffle 51 as shown in FIG. 2. The operator removes baffle 51 and replaces it with another baffle 51' (FIG. 4). Referring to FIG. 3, test baffle 51 in the first embodiment preferably has its conical section 53 closely spaced to test gear teeth 47. In FIG. 4, baffle 51' is somewhat of a different configuration and has its conical section 53a' spaced much farther from gear teeth 47 than that of FIG. 3. Alternately, baffle 51' might have more or less outlet openings 61 (FIG. 2), or the opening 61 may be spaced at different distances from opening segment 59. The operator repeats the test as described above for baffle 51' in order to determine which requires less horsepower and/or results in the lesser temperature rise. The operator may test any number of baffles in this manner, the baffles differing in shape, spacing or outlet.

In one series of tests, test gear 45 was rotated in a range from 1000 to 6500 rpm. Test gear 45 was formed of a low-viscosity, rapid setting and rigid urethane compound with a diameter of about 15 inches. This resulted in a peripheral velocity of approximately 25,000 feet per minute. Motor 41 was a 5 horsepower motor. The liquid comprised water and in some of the tests oil, and had an initial temperature before each test of 75 degrees F. Initial baseline testing was performed without any baffle 51 and under conditions without liquid being discharged and with liquid being discharged. Over 50 tests were run with seven different designs of baffles 51.

The invention has significant advantages. It allows gear windage to be tested with a variety of baffle shapes, and with different shapes, sizes, positioning and number of exit openings. Various parameters can be monitored to determine the most efficient baffle shapes, spacings, and exit openings.

While the invention has been shown in only one of its forms, it should be apparent to those skilled in the art that it is not so limited, but is susceptible to various changes without departing from the scope of the invention. For example, although shown testing only a bevel gear, other types of gears may be tested.

I claim:
1. An apparatus for testing windage on a gear, comprising:
   a case having a sump;
   a shaft rotatably mounted in the case for receiving and rotating a gear for testing;
   a power source operatively coupled to the shaft for driving the shaft;
   at least one nozzle mounted in the case for discharging a liquid onto the gear, the liquid adapted to collect in the sump after discharging on the gear;
   a pump connected to the sump and the nozzle for pumping the liquid from the sump to the nozzle;
   the case has a wall for mounting a baffle thereto for enclosing at least a portion of the gear to test the efficiency of the baffle on reducing windage on the gear and
   wherein a least a portion of the case is transparent to observe the baffle while undergoing testing.
2. An apparatus for testing windage on a gear, comprising:
   a case having a sump;
   a shaft rotatably mounted in the case for receiving and rotating a gear for testing;
   a power source operatively coupled to the shaft for driving the shaft;
   at least one nozzle mounted in the case for discharging a liquid onto the gear, the liquid adapted to collect in the sump after discharging on the gear;
   a pump connected to the sump and the nozzle for pumping the liquid from the sump to the nozzle; wherein
   the case has a wall for mounting a baffle thereto for enclosing at least a portion of the gear to test the efficiency of the baffle on reducing windage on the gear; and
   a power sensor coupled to the power source for determining the amount of power required of the power source to rotate the gear.

3. An apparatus for testing windage on a gear, comprising:

a case having a sump;

a shaft rotatably mounted in the case for receiving and rotating a gear for testing;

a power source operatively coupled to the shaft for driving the shaft;

at least one nozzle mounted in the case for discharging a liquid onto the gear, the liquid adapted to collect in the sump after discharging on the gear;

a pump connected to the sump and the nozzle for pumping the liquid from the sump to the nozzle; wherein the case has a wall for mounting a baffle thereto for enclosing at least a portion of the gear to test the efficiency of the baffle on reducing windage on the gear; and a plurality of temperature sensors for monitoring temperatures of the interior of the case, the liquid in the sump, and the baffle.

4. The apparatus according to claim 1, further comprising a heat exchanger for cooling the liquid collected from the sump at the completion of each of the tests.

5. The apparatus according to claim 2, wherein the power source comprises an electrical motor; and wherein the power sensor comprises:

a current sensor for sensing the current required to rotate the electrical motor.

6. An apparatus for testing windage on a gear, comprising:

a case having a sump;

a shaft rotatably mounted in the case for receiving and rotating a gear for testing;

a power source operatively coupled to the shaft for driving the shaft;

at least one nozzle mounted in the case for discharging a liquid onto the gear, the liquid adapted to collect in the sump after discharging on the gear;

a pump connected to the sump and the nozzle for pumping the liquid from the sump to the nozzle; wherein the case has a wall for mounting a baffle thereto for enclosing at least a portion of the gear to test the efficiency of the baffle on reducing windage on the gear; and wherein the case further comprises:

a partition located above the sump and below the nozzle, the partition having a hole therethrough for draining liquid discharged from the nozzle into the sump.

7. An apparatus for testing windage on a gear, comprising:

a case having a sump;

a shaft rotatably mounted in the case for receiving and rotating a gear for testing;

a power source operatively coupled to the shaft for driving the shaft;

at least one nozzle mounted in the case for discharging a liquid onto the gear, the liquid adapted to collect in the sump after discharging on the gear;

a pump connected to the sump and the nozzle for pumping the liquid from the sump to the nozzle; wherein the case has a wall for mounting a baffle thereto for enclosing at least a portion of the gear to test the efficiency of the baffle on reducing windage on the gear; and a blocking plate mounted to the case and having an edge adapted to extend in close proximity to the gear adjacent the nozzle to simulate blockage of liquid on one side of the nozzle that is caused by a pinion gear.

8. A test apparatus, comprising:

a case having a sump;

a shaft rotatably mounted in the case;

a test gear mounted to the shaft for rotation therewith, a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle; and at least one sensor for measuring the amount of power required of the power source to rotate the gear for comparing the test baffle to other test baffles having different configurations or spacings relative to the test gear.

9. A test apparatus, comprising:

a case having a sump;

a shaft rotatably mounted in the case;

a test gear mounted to the shaft for rotation therewith;

a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle;

at least one sensor for measuring the amount of power required of the power source to rotate the gear for comparing the test baffle to other test baffles having different configurations or spacings relative to the test gear; and wherein the inlet segment of the baffle has a circumferential extent, and the baffle has at least one outlet segment spaced circumferentially from the inlet segment for discharging the liquid from the baffle.

10. The apparatus according to claim 9, wherein the outlet segment of the baffle has a circumferential extent that is less than the circumferential extent of the inlet segment.

11. A test apparatus, comprising:

a case having a sump;

a shaft rotatably mounted in the case;

a test gear mounted to the shaft for rotation therewith;

a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle;

at least one sensor for measuring the amount of power required of the power source to rotate the gear for comparing the test baffle to other test baffles having different configurations or spacings relative to the test gear; and a blocking plate mounted to the case and having an edge in close proximity to the test gear within the inlet segment and located on one side of the nozzle, for blocking liquid being sprayed from the nozzle in one direction to simulate the effect of a pinion gear.

12. A test apparatus, comprising:

a case having a sump;

a shaft rotatably mounted in the case;

a test gear mounted to the shaft for rotation therewith;

a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle;

at least one sensor for measuring the amount of power required of the power source to rotate the gear for comparing the test baffle to other test baffles having different configurations or spacings relative to the test gear; and a temperature sensor for determining temperature rise of the liquid in the sump, the temperature rise of the baffle, and the temperature rise of the atmosphere within the case due to windage.

13. The apparatus according to claim 8, further comprising a heat exchanger for cooling the liquid collected from the sump prior to performing a subsequent test.

14. A test apparatus, comprising:

a case having a sump;

a shaft rotatably mounted in the case;

a test gear mounted to the shaft for rotation therewith;

a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle;

at least one sensor for measuring the amount of power required of the power source to rotate the gear for comparing the test baffle to other test baffles having different configurations or spacings relative to the test gear; wherein the power source comprises an electrical motor; and wherein the power sensor comprises:

a current sensor for sensing the current required to rotate the electrical motor.

15. A test apparatus, comprising:

a case having a sump;

a shaft rotatably mounted in the case;

a test gear mounted to the shaft for rotation therewith;

a power source operatively coupled to the shaft for rotating the shaft;

a test baffle mounted to the case and partially enclosing the gear to reduce windage on the gear, the test baffle being generally bowl-shaped and having an inlet segment that is open, exposing a portion of the gear;

a nozzle mounted in the case and having an outlet adjacent the inlet segment of the test baffle for discharging a liquid onto the gear, the liquid adapted to collect in the sump after discharging on the gear;

a pump connected to the sump and the nozzle for pumping the liquid from the sump to the nozzle;

at least one sensor for measuring the amount of power required of the power source to rotate the gear for comparing the test baffle to other test baffles having different configurations or spacings relative to the test gear; and wherein the case further comprises:

a partition located above the sump and below the nozzle, the partition having at least one hole therethrough for draining liquid discharged from the nozzle into the sump.

16. A method for testing windage on a gear, comprising:

(a) mounting a shaft within a case;

(b) mounting a test gear to the shaft for rotation therewith;

(c) partially enclosing the test gear with a first test baffle; then (d) discharging a liquid onto the test gear and rotating the shaft and the test gear;

(e) monitoring the amount of power required to rotate the shaft to determine the efficiency of the first test baffle in reducing windage;

removing the first test baffle and replacing the first test baffle with a second test baffle having a different configuration than the first test baffle; then repeating steps (a) for the second test baffle and comparing the power required to rotate the shaft while using the second test baffle to the power required to rotate the shaft while using the first test baffle.

17. A method for testing windage on a gear, comprising:

(a) mounting a shaft within a case;

(b) mounting a test gear to the shaft for rotation therewith;

(c) partially enclosing the test gear with a test baffle; then (d) discharging a liquid onto the test gear and rotating the shaft and the test gear; and (e) monitoring the amount of power required to rotate the shaft to determine the efficiency of the test baffle in reducing windage; and measuring the temperature in the case adjacent the gear to determine the efficiency of the test baffle in reducing temperature rise.

18. A method for testing windage on a gear, comprising:

(a) mounting a shaft within a case;

(b) mounting a test gear to the shaft for rotation therewith;

(c) partially enclosing the test gear with a test baffle; then (d) discharging a liquid onto the test gear and rotating the shaft and the test gear; and (e) monitoring the amount of power required to rotate the shaft to determine the efficiency of the test baffle in reducing windage; and wherein step (d) comprises discharging the liquid through two nozzles onto teeth of the test gear, the nozzles being spaced circumferentially apart from each other and separated by a blocking plate.

19. A method for testing windage on a gear, comprising:

(a) mounting a shaft within a case;

(b) mounting a test gear to the shaft for rotation therewith;

(c) partially enclosing the test gear with a test baffle; then (d) discharging a liquid onto the test gear and rotating the shaft and the test gear; and (e) monitoring the amount of power required to rotate the shaft to determine the efficiency of the test baffle in reducing windage; and wherein step (d) comprises rotating the shaft with an electrical motor, and step (e) comprises measuring the current required to operate the motor.

20. A method for testing windage on a gear, comprising:

(a) mounting a shaft within a case;

(b) mounting a test gear to the shaft for rotation therewith;

(c) partially enclosing the test gear with a test baffle; then (d) discharging a liquid onto the test gear and rotating the shaft and the test gear; and (e) monitoring the amount of power required to rotate the shaft to determine the efficiency of the test baffle in reducing windage; and wherein step (c) comprises providing a pinion gear opening in the test baffle, and step (d) comprises discharging the liquid into the pinion gear opening.

* * * * *